United States Patent
Kamimura et al.

(10) Patent No.: US 8,549,009 B2
(45) Date of Patent: Oct. 1, 2013

(54) XML DATA PROCESSING SYSTEM, DATA PROCESSING METHOD AND XML DATA PROCESSING CONTROL PROGRAM USED FOR THE SYSTEM

(75) Inventors: Junpei Kamimura, Minato-ku (JP); Takehiko Kashiwagi, Minato-ku (JP)

(73) Assignee: NEC Corporation, Tokyo (JP)

( * ) Notice: Subject to any disclaimer, the term of this patent is extended or adjusted under 35 U.S.C. 154(b) by 174 days.

(21) Appl. No.: 12/676,851

(22) PCT Filed: Jul. 23, 2008

(86) PCT No.: PCT/JP2008/063150
§ 371 (c)(1),
(2), (4) Date: Mar. 5, 2010

(87) PCT Pub. No.: WO2009/031370
PCT Pub. Date: Mar. 12, 2009

(65) Prior Publication Data
US 2010/0250551 A1     Sep. 30, 2010

(30) Foreign Application Priority Data
Sep. 7, 2007   (JP) .................. 2007-233159

(51) Int. Cl.
*G06F 17/30*   (2006.01)
(52) U.S. Cl.
USPC .......................... 707/741; 707/769
(58) Field of Classification Search
USPC .................... 707/741, 769
See application file for complete search history.

(56) References Cited

U.S. PATENT DOCUMENTS

| | | | |
|---|---|---|---|
| 7,457,810 B2* | 11/2008 | Breining et al. | 707/999.101 |
| 7,499,915 B2* | 3/2009 | Chandrasekar et al. | 707/E17.012 |
| 2003/0212662 A1 | 11/2003 | Shin et al. | |
| 2004/0193581 A1* | 9/2004 | Heuer et al. | 707/3 |
| 2005/0228792 A1 | 10/2005 | Chandrasekaran et al. | |
| 2005/0228828 A1* | 10/2005 | Chandrasekar et al. | 707/104.1 |
| 2008/0222187 A1* | 9/2008 | Beyer et al. | 707/102 |

FOREIGN PATENT DOCUMENTS

| | | |
|---|---|---|
| JP | 2002-202973 B2 | 7/2002 |
| JP | 2004-030569 A | 1/2004 |
| JP | 2006-189951 A | 7/2006 |
| WO | 2005/101246 A1 | 10/2005 |
| WO | 2005/119516 A1 | 12/2005 |

OTHER PUBLICATIONS

S. Al-Khalifa, et al., "Structural Joins: A Primitive for Efficient XML Query Pattern Matching," 2002, pp. 1-12, ICDE.
T. Eda, et al., "Fast XPath Processing with SXL Summaries," 2005, pp. 1-10, NTT Laboratories.

(Continued)

*Primary Examiner* — Wilson Lee
*Assistant Examiner* — Thuy Bui
(74) *Attorney, Agent, or Firm* — Sughrue Mion, PLLC

(57) ABSTRACT

XML analyzer 11 analyzes and decomposes XML data ina into nodes and assigns node identifiers to the nodes to produce XML data inb while creating indexes ix for specifying node identifiers for XML data inb on the basis of XPath expression F. Storage 12 stores XML data inb while index storage 13 stores indexes ix. XPath expression processor 14 uses indexes ix to acquire the node identifiers corresponding to XPath expression F while acquiring XML data inc corresponding to the node identifiers from stored XML data inb.

8 Claims, 4 Drawing Sheets

(56) References Cited

OTHER PUBLICATIONS

R. Goldman, et al., "DataGuides: Enabling Query Formulation and Optimization in Semistructured Databases," pp. 1-21.

Office Action dated Feb. 19, 2013 issued by the Japanese Patent Office in counterpart Japanese Application No. 2009-531159.
Office Action dated May 7, 2013 issued by the Japanese Patent Office in counterpart Japanese Patent Application No. 2009-531159.

* cited by examiner

Fig.2 data1.xml

```
1  <a>
2    <b>
3      <c>test_data1</c>
     </b>
   </a>
``` data2.xml

```
4  <c>
5    <b>
6      <a>test_data2</a>
     </b>
   </c>
```

Fig.3

13a PATH TABLE

| pID | path |
|-----|------|
| 1 | //a// |
| 2 | //a/b// |
| 3 | //a/b/c// |
| 4 | //b// |
| 5 | //b/c// |
| 6 | //c// |
| 7 | //c/b// |
| 8 | //c/b/a// |
| 9 | //b/a// |

Fig.4

PATH IDENTIFIER SET TABLE
13b

| pID | list |
|---|---|
| 1 | {1,2,3,8,9} |
| 2 | {2,3} |
| 3 | {3} |
| 4 | {2,3,4,5,7,8,9} |
| 5 | {3,5} |
| 6 | {3,5,6,7,8} |
| 7 | {7,8} |
| 8 | {8} |
| 9 | {8,9} |

Fig.5

13c NODE LIST

| nc1 |
|---|
| 1 |

| nc2 |
|---|
| 2 |

| nc3 |
|---|
| 3 |

| nc6 |
|---|
| 4 |

| nc7 |
|---|
| 5 |

| nc8 |
|---|
| 6 |

PATH IDENTIFIER SET TABLE
13b

| pID | list |
|---|---|
| 1 | {1, 2, 3, 8} |
| 2 | {2, 3} |
| 3 | {3} |
| 4 | {2, 3, 7, 8} |
| 5 | {3} |
| 6 | {3, 6, 7, 8} |
| 7 | {7, 8} |
| 8 | {8} |
| 9 | {8} |

XML DATA PROCESSING SYSTEM, DATA PROCESSING METHOD AND XML DATA PROCESSING CONTROL PROGRAM USED FOR THE SYSTEM

TECHNICAL FIELD

The present invention relates to an XML data processing system, a data processing method and an XML data processing control program used for the system and, in particular, to an XML data processing system, a data processing method and XML data processing control program used for the system that are suitable for use in applications that need fast processing for extracting portions of input XML (eXtensible Markup Language) data that are specified by XPath expressions for identifying portions of the input XML data.

BACKGROUND ART

Since XML (eXtensible Markup Language) was recommended by the W3C (World Wide Web Consortium) in 1998, XML has been widely used and has become a standard format for data exchange between computers. XQuery became a W3C recommendation on Jul. 1, 2007, enhancing the XML environment. XML data (XML documents) are documents or data created in a language conforming to XML and are written in such a manner that a tree structure of nodes such as elements and attributes is built.

For example, XML data may be written as follows:

| [(XML statement)] |
| --- |
| 1 <books> |
| 1.1 <book> |
| 1.1.1 <author>author_name1</author> |
| 1.1.2 <title>title1</title> |
| 1.1.3 <price>100</price> |
|   </book> |
| 1.2 <book> |
| 1.2.1 <author>author_name2</author> |
| 1.2.2 <title>title2</title2> |
| </book> |
| </books> |

An element, which is one node, includes a start tag, content, and an end tag. For example, "<price>100</price>" is an element, where "<price>" is the start tag, "100" is the content, and "</price>" is the end tag. An element can include another element. XPath is a language syntax indicating a specific component or components of XML data. XPath is an important constitutional part in operations on XML data, such as XQuery, XSLT (XSL transformations: a standard for data transformation from one XML file to another). XPath expressions are actual expressions written in accordance with XPath specifications. For example, "//books//book" and "//books/book" are XPath expressions. In an XPath expression, the double slash "//" indicates a "descendant" in a parent-child relationship between the elements in a tree structure of XML data and a slash "/" indicates a "child". The numbers in the leftmost part of the XML data given above are identifies (node IDs, or nIDs) of the element nodes of the XML data. The numbers are added for illustration purposes and are not included in actual XML data. In this example, numbers representing the order of siblings are added to the identifiers of parent elements with "." to create the identifiers of child elements, thereby enabling ancestor-descendant relationships to be identified based on the identifiers.

There are a number of known methods for extracting XML nodes identified by given XPath expressions from XML data. Examples include a method in which an XML data tree is searched, a method that uses structural joins as described in documents such as "Structural Joins: A Primitive for Efficient XML Query Pattern Matching" (N. Koudas J. M. Patel S. Al-Khalifa, H. V. Jagadish, D. Srivastava, and Yuqing Wu, in ICDE, 2002), and a (hybrid) method combining these methods, such as a method described in "Fast XPath processing with XML Summaries" (Takeharu Eda, Makoto Onizuka, and Masashi Yamamuro, The Journal of the Institute of Electronics, Information and Communication Engineers D, 2006, Vol. J89-D, pp. 139-150).

Any of these methods can be used to extract a set of the identifiers of element nodes {1.1, 1.2} if an XPath expression, for example "//books//book", is given for the XML data.

For example, in the method in which an XML data tree is searched, the nodes of an XML data tree are traversed to search for a structure that matches the pattern of the XPath expression "//books//book". In doing this, an automaton generated from the XPath expression is used to traverse the nodes of the XML data being searched to find a target node. As a result, a set of identifiers {1.1, 1.2} can be acquired. In the method that uses structural joins, element nodes of XML data are acquired and ancestor-descendant relationships between the element nodes are determined by using labels assigned to the element nodes. That is, the XPath expression ("//books//book") is decomposed into the pattern "//books" and the pattern "//book", an identifier set {1} for the same pattern "//books" is obtained, and an identifier set {1.1, 1.2} is acquired for the same pattern "//book". Then, identifier sets that are in an ancestor-descendant relationship are searched for among these identifier sets. Since there are parent-child relationships "1→1.1" and "1→1.2" in this example, an identifier set {1.1, 1.2} can be acquired. In the hybrid method which is a combination of these methods, structural joins are performed only on predicates, thereby reducing the number of structural joins.

However, the method in which an XML data tree is searched involves searching all branches and therefore does not have scalability according to the amount of XML data. That is, processing time increases at a geometric rate as the number of nodes making up XML data increases. In the method that uses structural joins, the number of elements of sets of node identifies increases as the amount of XML data increases. Accordingly, the time required for determining ancestor-descendant relationships between all the elements increases geometrically. The hybrid method that combines these methods reduces the number of structural joins by performing structural joins only on predicates and provides an effect in a way different from the present invention.

DISCLOSURE OF THE INVENTION

The present invention has been made under these circumstances and an object of the present invention is to provide an XML data processing system, a data processing method and an XML data processing control program used for the system that are capable of fast processing on input XML data to extract portions of the XML data that are specified by XPath expressions.

To achieve the object, the present invention provides an XML data processing system performing processing on input first XML data to extract a portion that meets an XPath expression for identifying a portion of the first XML data. The XML data processing system includes: an XML analyzer analyzing and decomposing the first XML data into nodes, assigning a node identifier to each of the nodes to produce second XML data, and creating an index for specifying the node identifiers on the XPath expression for the second XML data; an XML data storage storing the second XML data produced by the XML analyzer; an index storage storing the index created by the XML analyzer; and an XPath expression processor using the index stored in the index storage to acquire the node identifier corresponding to the XPath expression and accessing the XML data storage to acquire the second XML data corresponding to the node identifier.

According to the configuration of the present invention, the XML analyzer analyzes and decomposes the first XML data into nodes, assigns a node identifier to each of the nodes to produce second XML data, and creates an index for specifying node identifiers on the basis of an XPath expression for the second XML data. The XML data storage stores the second XML data while the index storage stores the indexes of the second XML data. The XPath expression processor uses the index to acquire a node identifier corresponding to the XPath expression and acquires XML data corresponding to the node identifier from the second XML data that have been stored. Accordingly, the need for searching the entire XML data and determining ancestor-descendant relationships between numerous nodes when structural joins are used is eliminated and processing for extracting portions that meet XPath expressions from the first data can be performed fast.

BRIEF DESCRIPTION OF THE DRAWINGS

FIG. 2 is a diagram illustrating exemplary XML data produced by an XML analyzer depicted in FIG. 1;

FIG. 3 illustrates a path table depicted in FIG. 1;

FIG. 4 illustrates a path identifier set table depicted in FIG. 1;

FIG. 5 illustrates a node list depicted in FIG. 1;

BEST MODE FOR CARRYING OUT THE INVENTION

Figure 1:
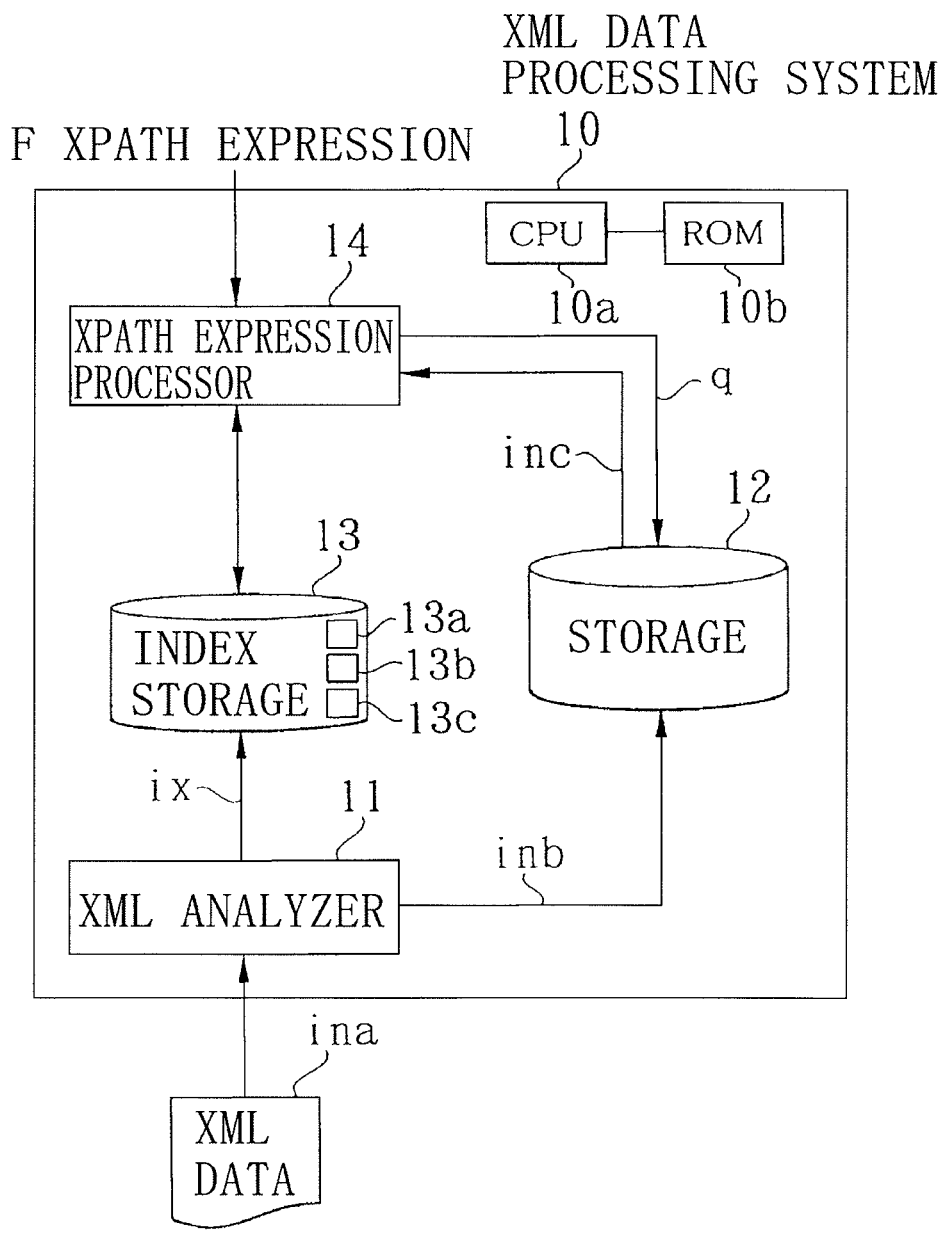
FIG. 1 is a block diagram illustrating an electrical configuration of the subject part of an XML data processing system of a first exemplary embodiment of the present invention.

There is provided an XML data processing system, a data processing method and an XML data processing control program used for the system in which the index created by the XML analyzer includes: a path table storing text expressions of all or some of the paths contained in the second XML data, each of the text expressions being assigned a path identifier; a path identifier set table storing, on a path-identifier-by-path-identifier basis, a set of the path identifiers assigned to paths included in each of the paths stored in the path table; and a node list storing a path identifier corresponding to a full path among the paths stored in the path table, in association with the node identifier of the last node of the full path in the second XML data.

The XPath expression processor uses a text expression included in the XPath expression as a first key to search the path table to acquire a first path identifier corresponding to the first key, uses the first path identifier as a second key to search the path identifier set table to acquire path identifier sets corresponding to the second key, acquires a common path identifier that is common to the path identifier sets, uses the acquired common path identifier as a third key to search the path table to acquire a path corresponding to the third key and, when the order in which tags appear in an text expression of the path corresponding to the acquired third key matches the order in which tags appear in a text expression of a path included in the XPath, acquires a second path identifier corresponding to the path that corresponds to the acquired third key from the path table, acquires the last node identifier corresponding to the second path identifier from the node list, and acquires the second XML data corresponding to a full path including a node to which the last node identifier is assigned from the XML data storage.

When the path in the XPath expression includes a symbol representing all child elements, the XPath expression processor removes the symbol representing all child elements to produce the first key.

Alternatively, when the path in the XPath expression includes a symbol representing all child elements, the XPath expression processor uses the path as the first key without removing the symbol representing all child elements; and the path table transforms the path including the symbol representing all child elements into a path having a text expression in common with the path among text expressions stored in the path table.

The node list is configured so that when the order in which tags appear in the text expression corresponding to the third key acquired by the XPath expression processor matches the order in which tags appear in the text expression of the path included in the XPath expression, the second path identifier corresponding to the path that corresponds to the acquired third key is acquired from the path table, and the last node identifier corresponding to the second path identifier is acquired from the node list in parallel with processing by the XPath expression.

[First Exemplary Embodiment]

FIG. 1 is a diagram illustrating an electrical configuration of the subject part of an XML data processing system of a first exemplary embodiment of the present invention.

XML data processing system 10 of the present exemplary embodiment, which may be a information processing apparatus such as a personal computer, includes CPU (Central Processing Unit) 10a as a computer controlling entire XML data processing system 10 and ROM (Read Only Memory) 10b on which an XML data processing control program for causing CPU 10a to operate is stored. In particular, XML data processing system 10 in the present exemplary embodiment includes XML analyzer 11, storage 12, index storage 13, and XPath expression processor 14 and performs processing on input XML data ina (first XML data) to extract portions of the XML data ina that meet XPath expression F for identifying portions of the XML data ina.

XML analyzer 11 analyzes XML data ina to decompose the XML data ina into nodes, assigns a unique document name to each of the documents making up XML data ina and a unique node identifier to each of the nodes making up XML data ina to produce XML data inb (second XML data). XML analyzer 11 also creates index ix for specifying a node identifier on the basis of XPath expression F for produced XML data inb. Storage 12 stores XML data inb produced by XML analyzer 11 and provides XML data c on a document-by-document basis or a node-by-node basis in response to acquisition request q from XPath expression processor 14. Index storage 13 stores index ix produced by XML analyzer 11.

Index ix includes path table 13a, path identifier set table 13b and node list 13c. Path table 13a stores all or some of the text expressions included in XML data inb along with path identifiers assigned to the text expressions and returns a path identifier in response to a query from XPath expression processor 14 that uses the text expression of a path as a key. Path identifier set table 13b stores, on a path-identifier-by-path-identifier basis, a set of path identifiers assigned to paths included in each path stored in path table 13a and returns a set of path identifiers corresponding to a path identifier in response to a query from XPath expression processor 14 that uses the path identifier as a key. Node list 13c stores path identifiers corresponding to full paths among the paths stored in path table 13a in association with the last node identifiers of the last nodes of the full paths in XML data inb.

XPath expression processor 14 uses index ix stored in index storage 13 to acquire a node identifier corresponding to XPath expression F and sends an acquisition request q to (makes access to) storage 12 to acquire XML data inc corresponding to the node identifier. In particular, XPath expression processor 14 in the present exemplary embodiment uses a text expression of the path included in XPath expression F as a first key to search path table 13a to acquire a first path identifier corresponding to the first key and then uses the acquired first path identifier as a second key to search path identifier set table 13b to acquire a path identifier set corresponding to the second key.

XPath expression processor 14 acquires a common path identifier that is common to acquired path identifier sets and uses the acquired common path identifier as a third key to search path table 13a to acquire a path corresponding to the third key. When the order in which tags appear in a text expression of the path corresponding to the acquired third key matches the order in which tags in a text expression are included in XPath expression F, XPath expression processor 14 acquires a second path identifier corresponding to the path that corresponds to the acquired third key from path table 13a. XPath expression processor 14 acquires the last node identifier corresponding to the second path identifier from node list 13c and acquires XML data inc corresponding to a full path consisting of nodes to which the last node identifier is assigned from storage 12. When a symbol representing all child elements is included in the path in XPath expression F, XPath expression processor 14 removes the symbol representing all child elements to produce the first key.

FIG. 2 is a diagram illustrating exemplary XML data inb produced by XML analyzer 11 depicted in FIG. 1; FIG. 3 illustrates path table 13a depicted in FIG. 1; FIG. 4 illustrates path identifier set table 13b depicted in FIG. 1; FIG. 5 illustrates node list 13c depicted in FIG. 1; and FIG. 6 is a flowchart illustrating operation of XML data processing system 10 depicted in FIG. 1.

A data processing method used for XML data processing system 10 depicted in FIG. 1 will be described with reference to the figures.

Figures 6, 7:
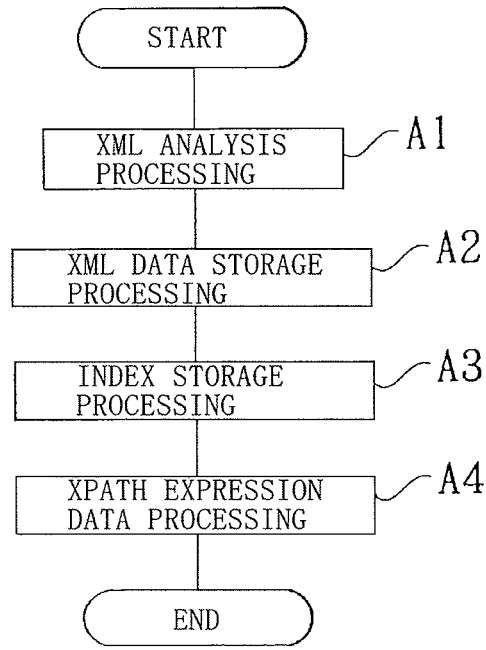
FIG. 6 is a flowchart illustrating operation of the XML data processing system depicted in FIG. 1.
FIG. 7 illustrates a path identifier table containing only the path identifiers of absolute paths among the path identifiers included in the sets of path identifies in the path identifier table depicted in FIG. 1.

As illustrated in FIG. 6, XML analyzer 11 in XML data processing system 10 analyzes and decomposes XML data into nodes, assigns a unique node to each of the nodes to produce XML data inb, and produces an index ix for specifying a node identifier on the basis of XPath expression F for produced XML data inb (step A1: XML analysis processing). Then, XML data inb is stored in storage 12 (step A2: XML data storage processing) and index ix is stored in index storage 13 (step A3: Index storage processing). XPath expression processor 14 uses index ix stored in the index storing process to acquire a node identifier corresponding to XPath expression F and acquires XML data inc corresponding to the node identifier from XML data inb stored in the XML data storage processing (step A4: XPath expression data processing). With this, processing is performed on XML data ina for extracting portions that meet XPath expression F is achieved.

In the XPath expression data processing, a text expression of the path included in XPath expression F is used as a first key to search path table 13a to acquire a first identifier corresponding to the first key, and the first path identifier is used as a second key to search path identifier set table 13b to acquire a path identifier set corresponding to the second key. Then, a common path identifier that is common among the acquired path identifier sets is acquired and is used as a third key to search path table 13a to acquire a path corresponding to the third key.

When the order in which tags appear in the text expression of the acquired path corresponding to the third key matches the order in which tags appear in the text expression of the path included in XPath expression F, a second path identifier corresponding to the acquired path that corresponds to the third key is acquired from path table 13a, the last node identifier corresponding to the second path identifier is acquired from node list 13c, and XML data inc corresponding to a full path consisting of the nodes to which the last node identifier is assigned is acquired from storage 12. In XPath expression data processing, when a symbol representing all child elements is included in a path in the XPath expression, the symbol representing all child elements is removed to produce the first key.

For example, input XML data ina includes the following two sets of XML data ([data1.xml] and [data2.xml]).

```
[data1.xml]

<a>
  <b>
    <c>test_data1</c>
  </b>
</a>
``` and

```
[data2.xml]

<c>
  <b>
    <a>test_data2</a>
  </b>
</c>
```

XML analyzer 11 decomposes XML data ina into nodes, assigns a node identifier ("1", "2", "3", "4", "5", "6") to each of the nodes to produce XML data inb as illustrated in FIG. 2, and stores XML data inb in storage 12. All or some of the paths contained in XML data inb are extracted, assigned path identifiers (pIDs), and stored in path table 13a by XML analyzer 11. A path or paths included in each path stored in path table 13a are detected by XML analyzer 11 and a set (list) of path identifiers (pIDs) assigned to the paths are stored in path identifier set table 13b on a pID-by-pID basis as illustrated in FIG. 4.

The path identifiers (pIDs) ("1", "2", "3", "6", "7", "8") corresponding to full paths among the paths stored in path table 13a are detected by XML analyzer 11. Each of the detected path identifiers (pIDs) is associated with the node identifier of the last node of the full path in XML data inb and stored in node list 13c as illustrated in FIG. 5.

XPath expression processor 14 performs the following processes 1 and 2, for example, based on input XPath expression F.

Process 1: When XPath Expression F is for Example "//a//c"

[Step 1: Path Decomposition]

First, XPath expression F "//a//c" is decomposed into paths by "//" and then "//" is added around each of the paths to provide elements "//a//" and "//c//".

[Step 2: Narrowing Down Candidate Paths]

Path table 13a (see FIG. 3) in index storage 13 is searched to find a path identifier set {1, 6} consisting of path identifiers (pIDs) corresponding to elements "//a//" and "//c//". Path identifier set table 13b in index storage 13 is searched to find the lists corresponding to path identifies "1" and "6":

list (1)={1, 2, 3, 8, 9} and
list (6)={3, 5, 6, 7, 8}

Then, path identifiers (common path identifiers) common to lists (1) and (6) are obtained:

list (1)∧list (6)={3, 8}

Path table 13a in index storage 13 is searched to find the paths "//a/b/c//" and "//c//b/a//" corresponding to path identifiers pIDs {3, 8} as candidate paths.

[Step 3: Verification of Candidate Paths]

The candidate paths obtained are assumed as full-path expressions ("/a/b/c" and "/c/b/a") and a determination is made as to whether the full-path expressions meet XPath expression F "//a//c". Since the order in which tags appear in path "a/b/c/" matches the order in which tags appear in XPath expression F "//a//c", it is determined that "3" is the target path identifier.

[Step 4: Acquisition of Target Node Identifier]

Node identifier "3" included in "nc3" with path identifier "3" in node list 13c in index storage 13 is the node identifier that meets XPath expression F "//a//c".

[Step 5: Acquisition of Target Node]

Acquisition request q is sent from XPath expression processor 14 to storage 12 to acquire the node associated with node identifier "3".

Process 2: When XPath Expression F Contains a Symbol (*) Representing All Child Elements Like "//c/*//a"

[Step 1: Path Decomposition]

First, XPath expression F "//c/*//a" is decomposed into paths by "//" and then "//" is added around each of the paths to provide elements "//c/*//" and "//a//". Then "/*" is removed from element "//c/*//" to provide elements "//c//" and "//a//".

[Step 2: Narrowing Down Candidate Paths]

Path table 13a (see FIG. 3) in index storage 13 is searched to find path identifier set {1, 6} consisting of the path identifiers corresponding to elements "//a//" and "//c//". Path identifier set table 13b in index storage 13 is searched to find the lists corresponding to path identifiers "1" and "6":

list (1)={1, 2, 3, 8, 9} and
list (2)={3, 5, 6, 7, 8}

Then, path identifiers (common path identifiers) common to lists (1) and (6) are obtained:

list (1)∧list (6)={3, 8}

Path table 13a in index storage 13 is searched to find the paths "//a/b/c//" and "//c//b/a//" corresponding to path identifiers pIDs {3, 8} as candidate paths.

[Step 3: Verification of Candidate Paths]

The candidate paths obtained are assumed as full-path expressions ("/a/b/c" and "/c/b/a") and a determination is made as to whether the full-path expressions meet XPath expression F "//c/*//a". Since the order in which tags appear in path "c/b/a" match the order in which tags appear in XPath expression F "//c/*//a", it is determined that "8" is the target path identifier pID.

[Step 4: Acquisition of Target Node Identifier]

Node identifier "6" included in "nc8" with path identifier "8" in node list 13c in index storage 13 is the node identifier that meets XPath expression F "//c/*//a".

[Step 5: Acquisition of Target Node]

Acquisition request q is sent from XPath expression processor 14 to storage 12 to acquire the node associated with node identifier "6".

In this way, according to the first exemplary embodiment, XML data ina is analyzed and decomposed into nodes and a node identifier is assigned to each of the nodes to produce XML data inb by XML analyzer 11. Index ix for specifying a node identifier on the basis of XPath expression F is created for produced XML data inb. XML data inb is stored in storage 12 and index ix is stored in index storage 13. XPath expression processor 14 uses index ix to acquire a node identifier that meets XPath expression F and acquires XML data inc corresponding to the node identifier from XML data inb. This eliminates the need for searching entire XML data and the need for determining ancestor-descendant relationships between numerous nodes when structural joins are used. Consequently, processing for extracting portions that meet XPath expression F from XML data ina is speeded up.

[Second Exemplary Embodiment]

In a second exemplary embodiment of the present invention, when the path in XPath expression F contains a symbol representing all child elements, XPath expression processor 14 depicted in FIG. 1 uses the path as a first key without removing the symbol. Path table 13a transforms the path containing the symbol representing all child elements into a path having a text expression in common with that path among the text expressions stored in path table 13a.

For example, XPath expression processor 14 performs the following processing based on input XPath expression F.

Example where XPath expression F contains a symbol (*) representing all child elements like "//c/*//a"

[Step 1: Path Decomposition]

First, XPath expression F "//c/*//a" is decomposed into paths by "//" and then "//" is added around each of the paths to provide elements "//c/*//" and "//a//".

[Step 2: Narrowing Down Candidate Paths]

Path table 13a (see FIG. 3) in index storage 13 is searched to find path identifier set {1, 7} consisting of the path identifiers (pIDs) corresponding to elements "//c/*//" and "//a//". Path table 13a has been created in such a manner that a path identifier {7} of a path that has a text expression (path "//c/b") in common with element "//c/*//" can be acquired. Path identifier set table 13b in index storage 13 is searched to find the lists corresponding to path identifiers "1" and "7":

list (1)={1, 2, 3, 8, 9} and
list (7)={7, 8}

Then, an identifier (common identifier) common to lists (1) and (7) is obtained:

list (7)∧list (1)={8}

Path table 13a in index storage 13 is searched to acquire the path "//c/b/a//" that has the identifier pID corresponding to {8} as a candidate path.

[Step 3: Verification of Candidate Path]

The candidate path acquired is assumed to be a full-path expression ("/c/b/a") and a determination is made as to whether the full-path expression meets XPath expression F "//c/*//a". Since the order in which tags appear in path "c/b/a" matches the order in which tags in XPath expression F "//c/*//a", it is determined that "8" is the target path identifier pID.

[Step 4: Acquisition of Target Node Identifier]

Node identifier "6" included in "nc8" with path identifier "8" in node list 13c in index storage 13 is the node identifier that meets XPath expression F "//c/*//a".

[Step 5: Acquisition of Target Node]

Acquisition request q is sent from XPath expression processor 14 to storage 12 to acquire the node corresponding to node identifier "6".

In this way, according to the second exemplary embodiment, path table 13a transforms a path containing a symbol representing all child elements into a path that has a text expression in common with that path among the text expressions stored in path table 13a. Therefore the second exemplary embodiment offers the same advantages as the first exemplary embodiment without removing a symbol representing all child elements contained in the path in XPath expression F.

While exemplary embodiments of the present invention have been described in detail with reference to the drawings, specific configurations are not limited to the exemplary embodiments. The present invention also embraces modifications made to any of the designs without departing from the spirit of the present invention.

For example, node list 13 may be configured so that when the order in which tags appear in a text expression of the path corresponding to a third key acquired by XPath expression processor 14 matches the order in which tags in a text expression of the path in XPath expression F, a second path identifier corresponding to the path that corresponds to the acquired third key is acquired from path table 13a, and the last node identifier corresponding to the second path identifier is acquired from node list 13c in parallel with processing by XPath expression processor 14. In this case, [Step 3: Verification of candidate paths] in any of the exemplary embodiments is performed in [Step 4: Acquisition of target node identifier] on node list 13c in parallel with processing on XPath expression processor 14. This parallelizes the processes and can speed up processing even when there are many candidate paths and it would take a long time to verify the candidate paths.

In step 2 (Narrowing down candidate paths) of any of the exemplary embodiments, it is not necessary to obtain path identifiers that are common among all lists from path identifier set table 13b. Instead, when the number of candidate path identifiers has decreased below a predetermined threshold, the process may proceed to step 3 (Verification of candidate paths). For example, if there is a list containing path identifiers whose numbers do not exceed a predetei mined threshold, the list may be used as the input in step 3. If there is more than one list, the list that contains the smallest number of path identifiers may be used. Storage 12 may include functions of a typical database, such as the functions of updating and deleting data, in addition to the capability of responding to acquisition requests q from XPath expression processor 14.

Identifiers (pIDs) included in a path identifier set (list) in path identifier set table 13b in index storage 13 may be limited to the path identifiers of absolute paths (paths from a root element).

In [Step 2: Narrowing down candidate paths], paths that exist as partial paths but not as absolute paths can be excluded from the narrowed-down candidates.

FIG. 7 illustrates a path identifier set table in which path identifies (pIDs) contained in path identifier sets (lists) are limited to the path identifiers of absolute paths (paths from root elements).

A process using such a path identifier set table will be described below with respected to an example in which XPath expression F "//b//c" is input. Only the differences from the processes described above will be described.

When the path identifier set table illustrated in FIG. 4 is used, [Step 2: Narrowing down candidate paths] would result in list (4)∧ list (6)={3, 5, 7, 8} and these paths would be used as inputs in [Step 3: Verification of candidate paths].

Among these paths, the path with path identifier 5 (/b/c) does not exist in input XML data (data1.xml, data2.xml) as an absolute path. Therefore the identifier is redundant.

On the other hand, in the process using the path identifier table illustrated in FIG. 7, [Step 2: Narrowing down candidate paths] results in list (4)∧ list (6)={3, 7, 8}. Thus, the unnecessary path identifier 5, which is included when the path identifier set table in FIG. 4 is used, can be excluded and processing relating to path identifier 5 does not need to be performed. Accordingly, processing can be speeded up.

The present invention is applicable to processing for extracting portions that meet an XPath expression from XML data in general and is especially effective in searching an XML database that handles large amounts of XML data.

While the present invention has been described with respect to exemplary embodiments, the present invention is not limited to the exemplary embodiments. Various modifications that are apparent to those skilled in the art can be made to configurations and details of the present invention without departing from the scope of the present invention.

The present application is based upon and claims the benefit of priority from the prior Japanese Patent Application No. 2007-233159 filed on Sep. 7, 2007 and the entire contents of the disclosure are incorporated herein.

The invention claimed is:

1. A data processing method used in an XML data processing system comprising an XML analyzer, an XML data storage, an index storage, and an XPath expression processor, and performing processing on input first XML data to extract a portion that meets an XPath expression for identifying a portion of the first XML data, the method comprising:

XML data analysis processing in which the XML analyzer analyzes and decomposes the first XML data into nodes, assigns a node identifier to each of the nodes to produce second XML data, and creates an index for specifying the node identifiers on the XPath expression for the second XML data;

XML data storage processing in which the XML data storage stores the second XML data produced by the XML analysis processing;

index storage processing in which the index storage stores the index created by the XML analysis processing; and XPath data processing in which the XPath expression processor uses the index stored in the index storage processing to acquire the node identifier corresponding to the XPath expression and acquires second XML data corresponding to the node identifier from the second XML data stored in the XML data storage processing, wherein the index created in the XML analysis processing by the XML analyzer comprises:

a path table storing text expressions of all or some of paths contained in the second XML data, each of the text expressions being assigned a path identifier, the paths thus included constituting partial paths;

a path identifier set table storing, on a path-identifier-by-path-identifier basis, a set of the path identifiers that are assigned to paths that include each of the paths stored in the path table; and a node list storing a path identifier corresponding to a full path among the paths stored in the path table, in association with the node identifier of the last node of the full path in the second XML data; and wherein in the XPath data processing, the XPath expression processor uses a text expression included in the XPath expression as a first key to search the path table to acquire a first path identifier corresponding to the first key, uses the first path identifier as a second key to search the path identifier set table to acquire path identifier sets corresponding to the second key, acquires a common path identifier that is common to the path identifier sets, uses the acquired common path identifier as a third key to search the path table to acquire a path corresponding to the third key and, when the order in which tags appear in an text expression of the path corresponding to the acquired third key matches the order in which tags appear in a text expression of a path included in the XPath, acquires a second path identifier corresponding to the path that corresponds to the acquired third key from the path table, acquires the last node identifier corresponding to the second path identifier from the node list, and acquires the second XML data corresponding to a full path including a node to which the last node identifier is assigned from the XML data storage.

2. The data processing method according to claim 1, wherein in the XPath expression data processing, when the path in the XPath expression includes a symbol representing all child elements, the XPath expression processor removes the symbol representing all child elements to produce the first key.

3. The data processing method according to claim 1, wherein:

in the XPath expression data processing, when the path in the XPath expression includes a symbol representing all child elements, the XPath expression processor uses the path as the first key without removing the symbol representing all child elements; and the path table transforms the path including the symbol representing all child elements into a path having a text expression in common with the path among text expressions stored in the path table.

4. The data processing method according to claim 1, wherein, the node list is configured so that when the order in which tags appear in the text expression corresponding to the third key acquired by the XPath expression processor matches the order in which tags appear in the text expression of the path included in the XPath expression, the second path identifier corresponding to the path that corresponds to the acquired third key is acquired from the path table, and the last node identifier corresponding to the second path identifier is acquired from the node list in parallel with processing by the XPath expression processor.

5. A non-transitory record medium storing an XML data processing control program adapted to implement an XML data processing system that processes input first XML data to extract a portion that meets an XPath expression for identifying a portion of the first XML data, the program causing a computer to execute procedures comprising:

an XML analyzing procedure adapted to analyze and decompose the first XML data into nodes, assigning a node identifier to each of the nodes to produce second XML data, and creating an index for specifying the node identifiers on the XPath expression for the second XML data;

an XML data storing procedure adapted to store the second XML data produced by the XML analyzing procedure;

an index storing procedure adapted to store the index created by the XML analyzing procedure; and an XPath expression processing procedure adapted to use the index stored by the index storing procedure to acquire the node identifier corresponding to the XPath expression and to acquire the second XML data corresponding to the node identifier from the second XML data stored by the XML data storing procedure, wherein the index created by the XML analyzing procedure comprises:

a path table storing text expressions of all or some of the paths contained in the second XML data, each of the text expressions being assigned a path identifier, the paths thus included constituting partial paths;

a path identifier set table storing, on a path-identifier-by-path-identifier basis, a set of the path identifiers that are assigned to paths that include each of the paths stored in the path table; and a node list storing a path identifier corresponding to a full path among the paths stored in the path table, in association with the node identifier of the last node of the full path in the second XML data; and wherein the XPath expression processing procedure uses a text expression included in the XPath expression as a first key to search the path table to acquire a first path identifier corresponding to the first key, uses the first path identifier as a second key to search the path identifier set table to acquire path identifier sets corresponding to the second key, acquires a common path identifier that is common to the path identifier sets, uses the acquired common path identifier as a third key to search the path table to acquire a path corresponding to the third key and, when the order in which tags appear in an text expression of the path that corresponds to the acquired third key matches the order in which tags appear in a text expression of a path included in the XPath, acquires a second path identifier corresponding to the path corresponding to the acquired third key from the path table, acquires the last node identifier corresponding to the second path identifier from the node list, and acquires the second XML data corresponding to a full path including a node to which the last node identifier is assigned from the second XML data stored by the XML data storing procedure.

6. The non-transitory record medium storing an XML data processing control program according to claim 5, wherein, when the path in the XPath expression includes a symbol representing all child elements, the XPath expression processing procedure removes the symbol representing all child elements to produce the first key.

7. The non-transitory record medium storing an XML data processing control program according to claim 5, wherein:

when the path in the XPath expression includes a symbol representing all child elements, the XPath expression processing procedure uses the path as the first key without removing the symbol representing all child elements; and the path table transforms the path including the symbol representing all child elements into a path having a text expression in common with the path among text expressions stored in the path table.

8. The non-transitory record medium storing an XML data processing control program according to claim 5, wherein, when the order in which tags appear in the text expression corresponding to the third key acquired by the XPath expression processing procedure matches the order in which tags appear in the text expression of the path included in the XPath expression, the node list acquires the second path identifier corresponding to the path that corresponds to the acquired third key from the path table, and the last node identifier corresponding to the second path identifier is acquired from the node list concurrently with the XPath expression processing procedure acquiring the last node identifier.

* * * * *